April 21, 1964 M. H. DAMON, JR 3,130,253
TARGET COORDINATE POSITIONER
Filed July 25, 1962 4 Sheets-Sheet 2

INVENTOR.
MELVIN H. DAMON, JR.
BY
Laurence S. Epstein
ATTORNEY

April 21, 1964　　　　M. H. DAMON, JR　　　　3,130,253
TARGET COORDINATE POSITIONER
Filed July 25, 1962　　　　　　　　　　　　　　　　4 Sheets-Sheet 3

INVENTOR.
MELVIN H. DAMON, JR.
BY
Lawrence S. Epstein
ATTORNEY

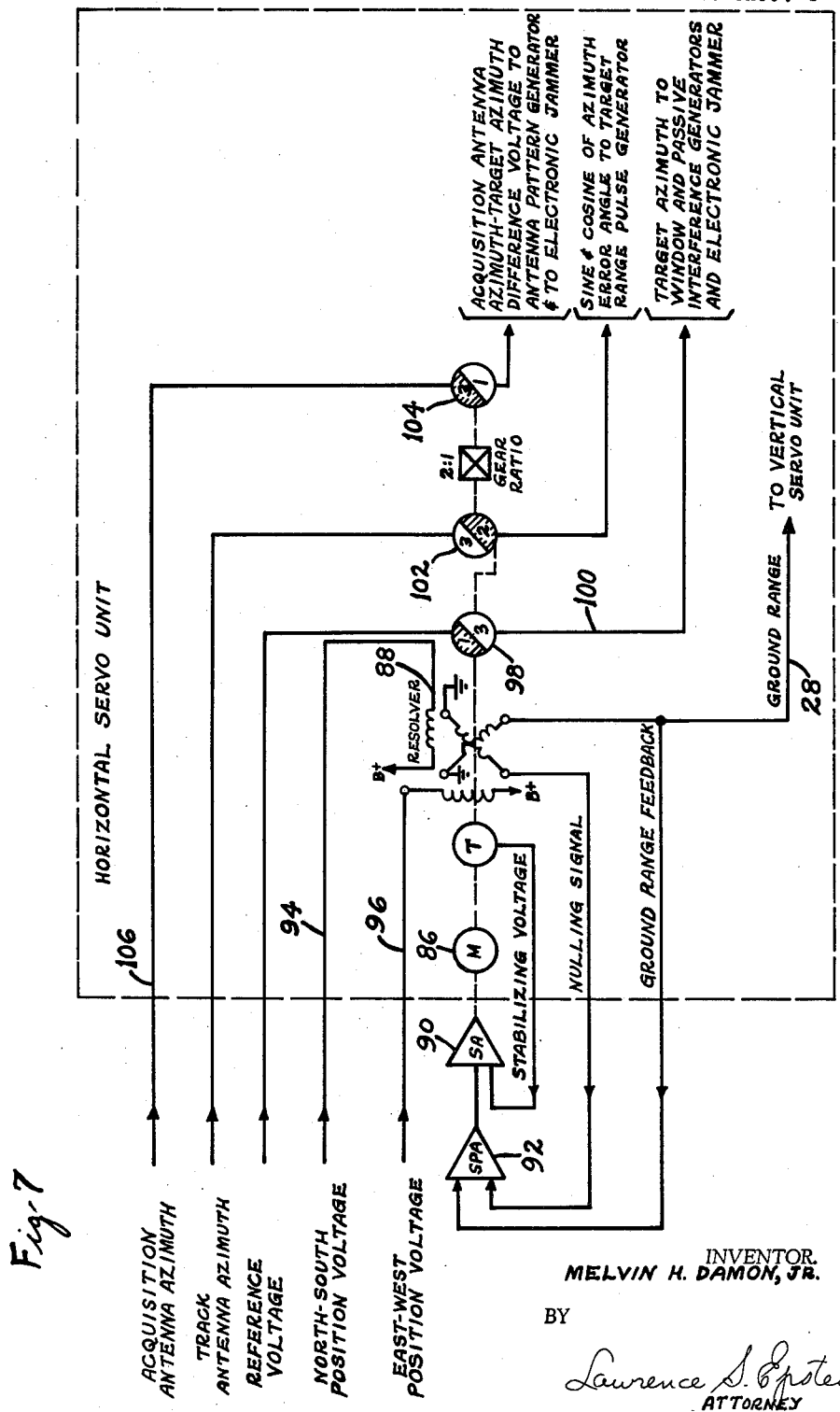

United States Patent Office 3,130,253
Patented Apr. 21, 1964

3,130,253
TARGET COORDINATE POSITIONER
Melvin H. Damon, Jr., Wayne, N.J., assignor, by mesne assignments, to the United States of America as represented by the Secretary of the Navy
Filed July 25, 1962, Ser. No. 212,493
7 Claims. (Cl. 35—10.4)

The present invention relates to training devices and is more particularly directed towards a simulator for continuously generating varying target coordinates.

In order to accurately and realistically simulate radar sets and systems, it is necessary to generate simulated radar targets. Signals generated by the instant invention when applied to a radar indicator will cause to be displayed thereon indications which characterize a normal desired target.

An object of the instant invention is to provide an improved apparatus for generating a simulated radar target.

A further object of the instant invention is provision of novel apparatus for determining the flight path of a simulated airborne target.

Another object of the instant invention is to provide an apparatus for simulating six targets simultaneously.

Other objects and many of the attendant advantages of this invention will be readily appreciated as the same becomes better understood by reference to the following detailed description when considered in connection with the accompanying drawings wherein:

FIG. 6 is a pictorial representation of the solution for north-south and east-west velocity components;

FIG. 7 is a block functional diagram of the horizontal servo unit;

Figure 1:
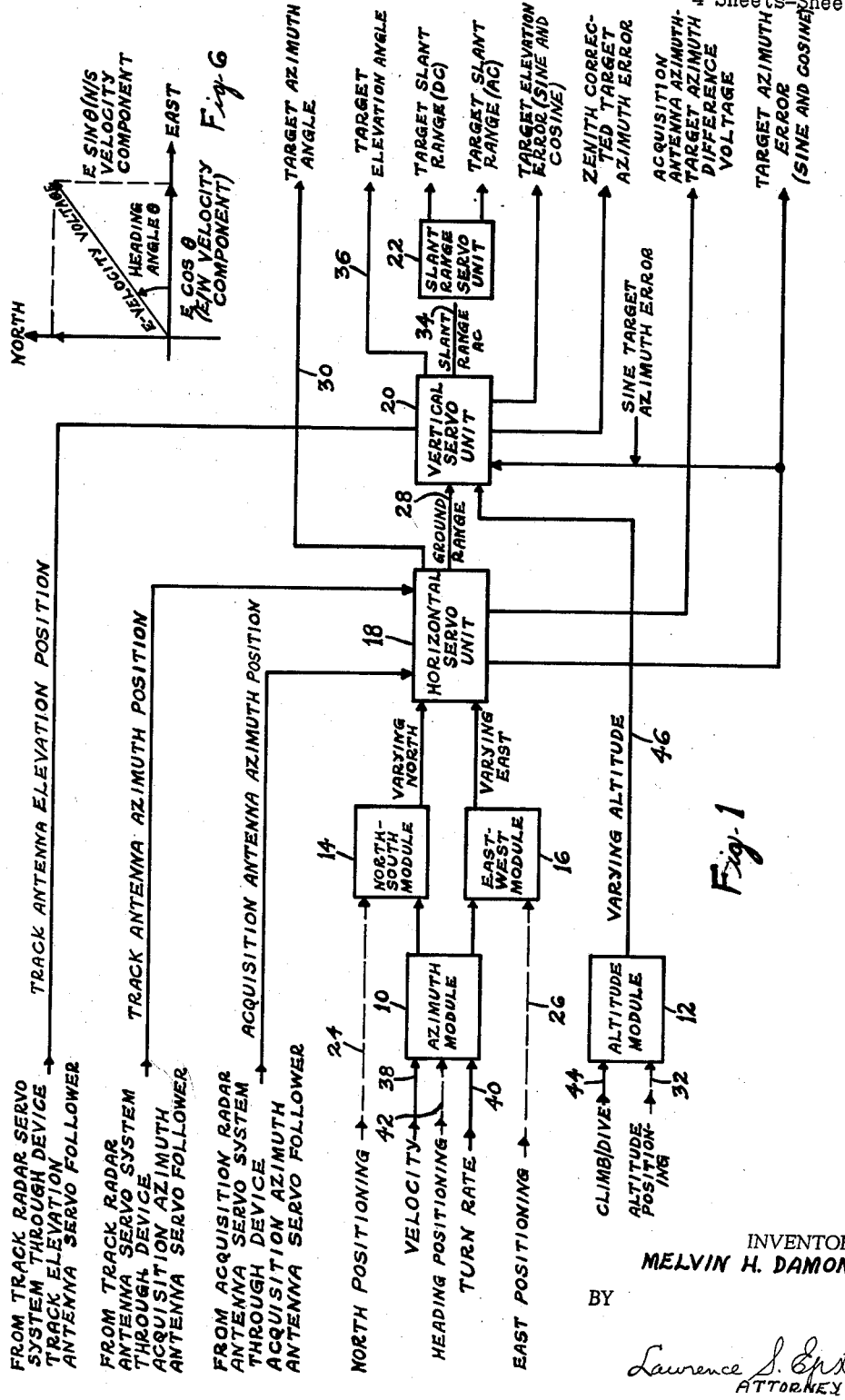
FIG. 1 is a block diagram of one embodiment of the invention.

Referring now to FIG. 1, the target coordinate generator consists of seven electromechanical subassemblies. Four velocity-type servo units namely the azimuth module 10, altitude module 12, the north-south module 14 and the east-west module 16 and three position-type servo units namely the horizontal servo unit 18, the vertical servo unit 20 and the slant range servo unit 22.

Figure 2:
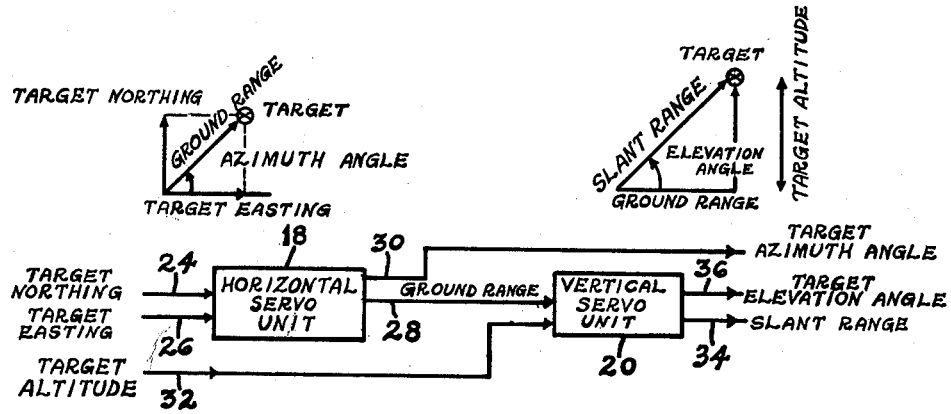
FIG. 2 is a simplified block diagram of the preferred embodiment of the invention.
Figure 3:
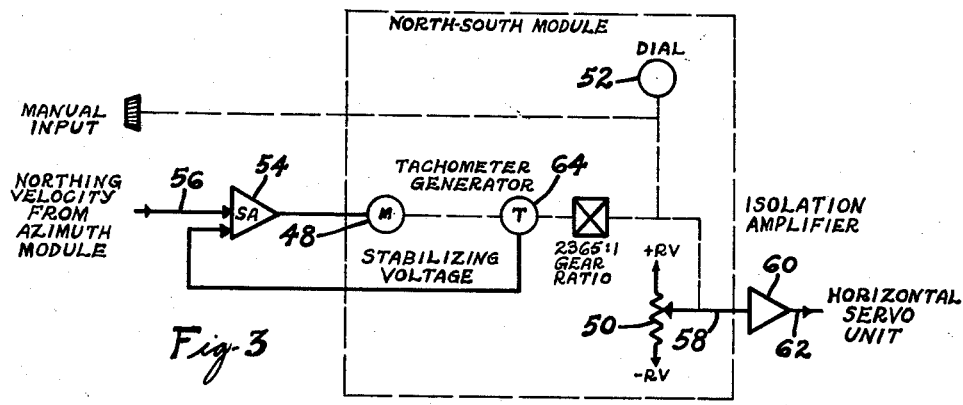
FIG. 3 is a block diagram of the north-south module utilized in the preferred embodiment of the target coordinate generator.
Figure 5:
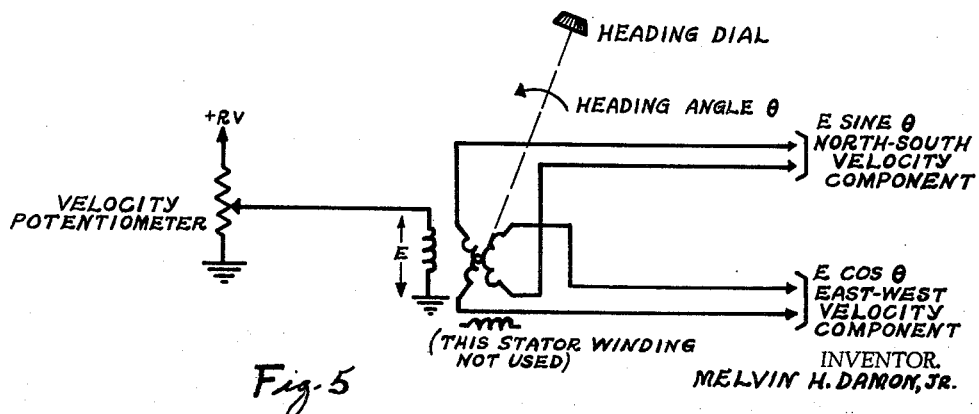
FIG. 5 is a simplified schematic diagram of the heading resolver utilized in the preferred embodiment of the instant invention.
Figure 4:
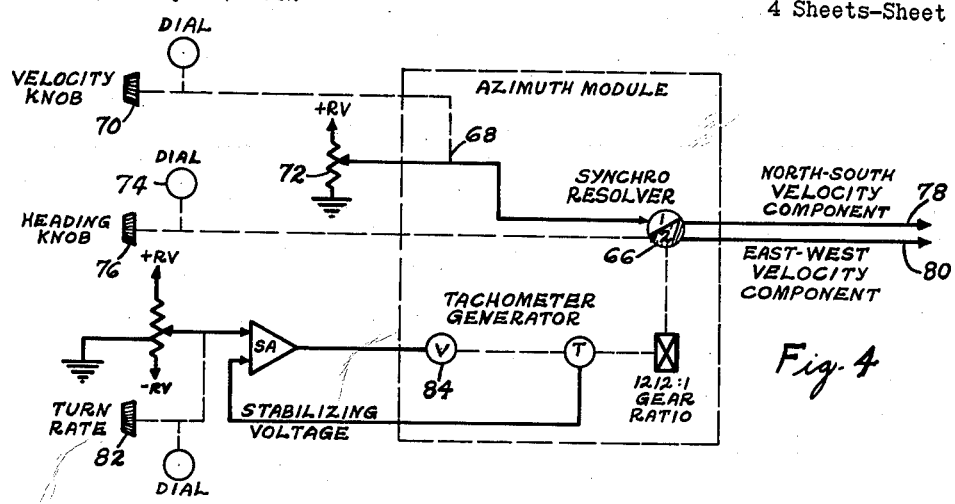
FIG. 4 is a block diagram of the azimuth module of the preferred embodiment of the target coordinate generator.
Figure 8:
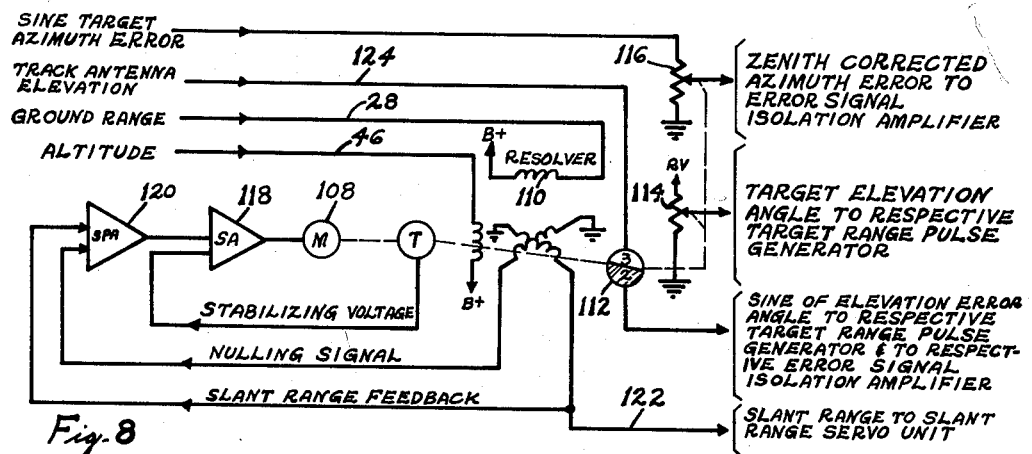
FIG. 8 is a block functional diagram of the vertical servo unit.
Figure 9:
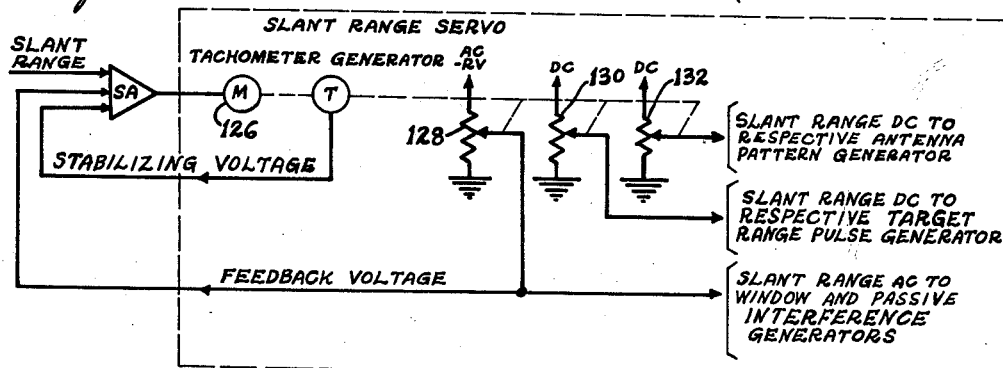
FIG. 9 is a block functional diagram of the slant range servo unit.

FIG. 2 shows a simplified block diagram of the target coordinate generator showing only three manual inputs and the resulant target motion component output voltages. The north-south component of the target position 24 called the northing and the east-west position component 26 called the easting are fed into the unit at the beginning of a training exercise by the device operator. Target northing and easting voltages are fed to the horizontal servo unit 18. In the horizontal servo unit these two voltages are combined vectorially to obtain the ground range 28 of the target at its azimuth angle 30. The ground range output is fed to the vertical servo unit 20 where it is combined with the target altitude 32 which is also set in manually at the beginning of a training problem. The vertical servo unit 20 combines these two voltages vectorially to produce slant range 34 and the target elevation angle 36.

The three manual inputs of the target coordinates, easting, northing and altitude, respectively 26, 24 and 32, can be made to vary throughout a training exercise by means of variable speed drives. The manner in which the manual controls determine the generations of the target coordinate voltages is given in the following detailed functional description. The target easting and northing at the start of a training problem are set into the east-west module 16 and the north-south module 14. The velocity 38, the turn rate 40 and the heading 42 are set into the azimuth module 10. Voltages varying in magnitude and phase are fed from this module to the north-south and east-west modules respectively 14 and 16 where they are used to change northing and easting values in such a manner as to change the simulated target's position at the desired rate. The outputs of these two modules are fed to the horizontal servo unit 18 where they are combined to produce ground range and azimuth angle 28 and 30 respectively. Target altitude 32 is set into the altitude module 12. Changes in the target altitude during the problem can also be simulated by setting the desired climb or dive rate 44 into this module. Changing altitude voltage 46 generated in the altitude module 12 is fed to the vertical servo unit 20 where it is combined with ground range 28 from the horizontal servo unit 18 to produce slant range 34 and elevation angle 36. Slant range is fed to the slant range servo unit 22 where it is converted to varying A.C and D.C. voltages.

The horizontal servo unit 18 and the vertical servo unit 20 also include error sensing devices which compare acquisition and track radar antenna position voltages with the simulated target angular positions and the errors between these voltages are fed to the other circuits in the radar simulator. The generation of target coordinate voltages is described in the following circuit description.

North-South Module

The north-south module consists of a servo motor 48 driving a potentiometer 50 and a dial 52 through appropriate gearing. The motor is driven by a servo amplifier 54 which receives its input voltage from a resolver rotor winding output 56 of the azimuth module 10. This voltage is amplified in the servo amplifier and is then used to drive the potentiometer 50. The varying voltage from the potentiometer wiper 58 represents the changing northing components of the target heading, and it is fed to an isolation amplifier 60 whose output 62 is fed to the horizontal servo unit 18. The motor 48 also drives a tachometer generator 64 whose output is fed back to the servo amplifier input 54 as a stabilizing or damping voltage.

East-West Module

Operation of this module is identical with that of the north-south module except that the input and output differ. Changing easting velocity component voltages are fed to this module from the azimuth module. Output from the east-west module, a varying easting voltage, is fed from the wiper of the potentiometer through an isolation amplifier to the horizontal servo unit.

Altitude Module

The altitude module consists of the same type of electromechanical components as the north-south and east-west modules, 14 and 16 respectively. Input to the servo amplifier is the climb-dive voltage 44 inserted manually. This climb-dive voltage controls speed and direction of rotation of the altitude module motor 48. This motor, in turn drives a potentiometer whose output follows the climbing or diving of the target, and this voltage is fed to the elevation servo unit in the vertical servo unit 20.

Azimuth Module

The azimuth module has a resolver 66 on the load shaft of a velocity-type servo mechanism. The input voltage to one stator winding of the resolver 66 is proportional to velocity 68. The manual velocity knob 70 adjusts potentiometer 72, which feeds a voltage proportional to the desired velocity to one winding (only one stator winding is used) of resolver 66. When the heading dial 74 on the target coordinate generator panel is turned to a desired heading angle by rotation of heading knob 76, the synchro rotor is also turned through this angle. The resulting relative position of the rotor windings with respect to the stator winding causes voltages to be induced in the rotor windings that are proportional to the velocity multiplied by the sine and cosine of the heading angle. Output voltages from the rotor windings, called the N/S velocity component 78 and E/W velocity component 80, are fed to the north-south module 14 and east-west module 16 respectively. If it is desired that the heading be changed during the training problem, the manual turn rate knob 82 on the target coordinate generator front panel can be set so that the resolver rotor is turned at a predetermined rate by a variable-speed drive motor 84. As a result, a continuously changing heading voltage will be induced in the rotor windings, representing a changing N/S and E/W velocity voltage.

Horizontal Servo Unit

The horizontal servo unit is a position servo consisting of a motor tachometer 86, synchro resolver 88, a synchro transmitter, a synchro transolver and a synchro receiver. A servo amplifier 90 and a servo preamplifier 92 operate in conjunction with the electromechanical components to complete the servo loop.

The N/S position voltage 94 is fed to one stator of resolver 88 and the E/W position voltage 96 is fed to the other stator. The servo motor 86 drives the resolver rotor 88 until there is zero output from one rotor winding at which time the output from the other rotor winding is ground range 28. Ground range voltage 28 is fed through an isolation amplifier to the vertical servo unit 20. The ground range signal is also fed back to the servo preamplifier 92 which also receives the nulling voltage from the nulling rotor winding.

The servo motor 86 also drives the rotor of synchro transmitter 98. The output voltage at the transmitter stators is the target azimuth voltage 100 which is fed to the synchros in the window and passive interference generators and to the electronic jammer. The shafts of synchro receiver 102 and synchro transolver 104 are also coupled to the servo motor 86. The rotor windings of the synchro receiver are excited by the acquisition antenna azimuth voltage 106 from the antenna servo followers.

Since the rotor is turned through an angle equal to the target azimuth angle, voltage at the synchro receiver stator windings is the difference of the acquisition antenna azimuth angle voltage and the target azimuth angle voltage. This voltage difference is fed to a respective antenna pattern generator and to the electronic jammer. The stator windings of the transolver 102 are excited by track antenna azimuth voltage from the antenna servo followers, and its rotor shaft is turned through an angle equal to the target azimuth angle. Output voltage from one rotor winding of the transolver is proportional to the sine of the angular error between the track antenna azimuth position and the target azimuth position, and the output voltage from the other rotor winding is proportional to the cosine of this angular error. Outputs from the transolver are fed to the respective target range pulse generator. The output from the transolver rotor sine winding is also used to excite the zenith correction potentiometer in the vertical servo unit 20.

Vertical Servo Unit

The vertical servo unit is a position servo whose basic components are a motor tachometer 108, a synchro resolver 110, a synchro transolver 112 and two potentiometers 114 and 116. A servo amplifier 118 and a servo preamplifier 120 operate in conjunction with the electromechanical components to complete the servo loop.

The altitude voltage 46 is fed to one stator of resolver 110. The ground range voltage 28 from the azimuth servo unit, is fed to the other stator. The servo motor 108 drives the resolver rotor until there is zero output from one rotor winding, at which time the output from the other rotor winding is the slant range 122. The slant range voltage 122 is fed to the slant range servo unit and to the servo preamplifier.

The input to the stator windings of transolver 112 is the track antenna elevation voltage 124. The shaft of this transolver is turned by the target elevation servo motor shaft. Output from one rotor winding is the sine of the track antenna elevation-target elevation error angle. This error signal is fed to a respective target range pulse generator and error signal isolation amplifier. The output from one of the potentiometers 114 is the target elevation angle voltage which is fed to a respective target range pulse generator. The other potentiometer 116 is excited by the sine of the azimuth error voltage and its output voltage is zenith-corrected azimuth error voltage. This voltage is fed to a respective error signal isolation amplifier.

Zenith Correction

The azimuth error angle generated in the horizontal servo unit of the target coordinate generator is in the ground plane. This necessitates a correction of the azimuth error angle when an elevation angle other than 0° is used. This correction is called zenith correction and is accomplished by multiplying the azimuth error angle (in the ground plane) by the cosine of the elevation angle. The cosine of 0° is unity; therefore, when an elevation angle of 0° is used, the azimuth error angle is unaffected.

Slant Range Servo Unit

The slant range servo unit is a position servo whose basic components are a motor tachometer 126 and three potentiometers 128, 130 and 132 respectively. Potentiometer 128 is used as a feedback potentiometer and supplies slant range to the window and passive interference generators which are used to generate window and passive interference as a function of range. The potentiometers 130 and 132 are excited by D.C. voltages. Potentiometer 130 provides a slant range D.C. to a respective target range pulse generator and potentiometer 132 supplies a slant range D.C. to a respective antenna pattern generator.

Thus it is seen that with the use of manual input voltages representing target positions, an azimuth module and an altitude module, a north-south module, an east-west module, a horizontal servo unit, a vertical servo unit and slant range servo units, the positions of targets and the coordinates of these targets corresponding to the functioning of the radar simulator are generated.

Obviously many modifications and variations of the present invention are possible in the light of the above teachings. It is therefore to be understood that within the scope of the appended claims the invention may be practiced otherwise than as specifically described.

What is claimed is:

1. An apparatus for generating target coordinates comprising means for generating D.C. voltage in proportion to target north-south position, target east-west position and the target altitude, said generation means being operatively connected to horizontal servo means and to vertical servo means, said horizontal and vertical servo means being electronic analog signal generation means whereby said target position north-south means and said target position east-west means are combined vectorially within said horizontal servo means for generation of a signal corresponding to the ground range of the target and its azimuth angles, said ground range signal and azimuth angle signal being applied from said horizontal servo means to said vertical servo means, said ground range signal being combined with said target altitude signal in said vertical servo means to produce a slant range signal and a target elevation angle signal, said azimuth signal being generated by said horizontal servo unit and applied together with said target elevation angle signal and said slant range signal to means for generating target signals in accordance with said azimuth angle, elevation angle and slant range signals.

2. Target position generating means for use in a radar trainer comprising means for generating signals which correspond to target north-south position, target east-west position, target velocity, target heading positioning turning rate, target climb-dive rate, target altitude positioning, acquisition antenna position, track antenna azimuth position and track antenna elevation position, said signal generating means being operatively connected to said target coordinate generating means and comprising an azimuth module, a north-south module and an east-west module, said azimuth module being operatively connected to said north-south and east-west modules, a horizontal servo unit being operatively connected to the outputs of said north-south and east-west modules, a vertical servo unit operatively connected to the output of said horizontal servo unit and to an altitude module, a slant range servo unit operatively connected to the output of said vertical servo unit, whereby said input signals and said modules produce signals representative of target coordinates, said signals being target azimuth angle, target elevation angle, target slant range angle, target elevation error, zenith corrected target azimuth error, acquisition antenna azimuth, and target azimuth error.

3. The combination of claim 2 wherein said azimuth module comprises a resolver operatively connected to the shaft of a velocity-type servo mechanism, said resolver comprising a tachometer generator operatively connected to the output of a servo amplifier and feedback means from the output of said amplifier to its input for stabilizing the operation of said servo mechanism.

4. The combination of claim 3 wherein said north-south module comprises a servo motor operatively connected to a potentiometer and a dial, said connection comprising mechanical gearing means, said servo motor being operatively connected to the output of a servo amplifier, said servo amplifier receiving its input voltage from a resolver rotor winding in the azimuth module, said motor driving a tachometer whose output is connected to drive said output potentiometer and feedback means operatively connected between said output potentiometer and the input of said servo amplifier for stabilization of the servo loop.

5. The combination of claim 4 wherein said horizontal servo unit comprises a motor tachometer, a synchro resolver operatively connected to said motor tachometer, a synchro transmitter operatively connected to the output of said motor tachometer, a synchro transolver and a synchro receiver, both said transolver and said receiver being operatively connected to the output of said motor tachometer, part of the output of said tachometer being fed back to the input of a servo amplifier whose output is connected to drive said motor tachometer, said feedback providing stabilization.

6. The combination of claim 5 and a servo preamplifier, said servo preamplifier connected to the input of said servo amplifier and input servo resolver.

7. The combination of claim 6 wherein said vertical servo unit comprises a motor tachometer and a servo amplifier, the output of said servo amplifier providing signals to drive said motor tachometer, a synchro resolver operatively connected to the output of said motor tachometer, a synchro transolver operatively connected to the output of said motor tachometer and two potentiometers operatively connected to the output of said motor tachometer for providing voltage signals proportional to their position, part of the output of said motor tachometer being fed back to said servo amplifier for stabilization of said servo loop and a servo preamplifier operatively connected to the input of said servo amplifier, part of the output of said synchro resolver being fed back to said servo preamplifier whereby input ground angle altitude signals applied to said resolver are transformed into target elevation angle and range signals for generation of target coordinates.

No references cited.